US009086087B1

(12) United States Patent
Sharman

(10) Patent No.: US 9,086,087 B1
(45) Date of Patent: Jul. 21, 2015

(54) MULTI-FORCE RESISTANT MECHANICAL JOINT

(71) Applicant: Charles Scott Sharman, Colorado Springs, CO (US)

(72) Inventor: Charles Scott Sharman, Colorado Springs, CO (US)

( * ) Notice: Subject to any disclaimer, the term of this patent is extended or adjusted under 35 U.S.C. 154(b) by 0 days.

(21) Appl. No.: 14/100,240

(22) Filed: Dec. 9, 2013

(51) Int. Cl.
*B25G 3/16* (2006.01)
*F16B 7/20* (2006.01)
*F16B 21/04* (2006.01)

(52) U.S. Cl.
CPC ...................... *F16B 21/04* (2013.01)

(58) Field of Classification Search
USPC ......... 403/316–318, 332, 348, 349, 350, 353, 403/358, 359.5, 359.6, 360, 361, 375, 383; 464/102, 104, 147, 150, 182
See application file for complete search history.

(56) References Cited

U.S. PATENT DOCUMENTS

| 362,548 | A | | 5/1887 | Smith | |
|---|---|---|---|---|---|
| 980,667 | A | | 1/1911 | Rhoads | |
| 2,011,147 | A | * | 8/1935 | Haselau | 464/104 |
| 2,047,414 | A | | 7/1936 | Smith | |
| 2,490,486 | A | * | 12/1949 | Spurlock | 301/9.1 |
| 3,005,282 | A | | 10/1961 | Christiansen | |
| 3,251,110 | A | | 5/1966 | Hedu | |
| 3,294,053 | A | * | 12/1966 | Emery, Jr. | 114/249 |
| 3,583,667 | A | | 6/1971 | Amneus | |
| 4,150,464 | A | | 4/1979 | Tracy | |
| 4,340,318 | A | | 7/1982 | Frosch | |
| 4,429,938 | A | * | 2/1984 | Flor | 439/314 |
| 4,756,638 | A | * | 7/1988 | Neyret | 403/261 |
| 5,018,901 | A | * | 5/1991 | Ferree et al. | 403/349 |
| 5,096,028 | A | * | 3/1992 | Suzuki | 188/357 |
| 5,582,547 | A | * | 12/1996 | Offerhaus | 464/172 |
| 5,597,260 | A | * | 1/1997 | Peterson | 403/319 |
| 5,749,592 | A | * | 5/1998 | Marchetto | 280/292 |
| 6,837,645 | B2 | * | 1/2005 | Kanatani et al. | 403/348 |
| 7,443,121 | B2 | * | 10/2008 | Nagai et al. | 318/434 |
| 7,670,228 | B2 | * | 3/2010 | Matsumoto et al. | 464/73 |
| 8,177,455 | B2 | * | 5/2012 | Zirin et al. | 403/348 |
| 2004/0185944 | A1 | * | 9/2004 | Barron et al. | 464/147 |
| 2012/0170974 | A1 | * | 7/2012 | Li et al. | 403/316 |

* cited by examiner

*Primary Examiner* — Gregory Binda
*Assistant Examiner* — Nahid Amiri

(57) ABSTRACT

A mechanical joint that resists any direction of imposed force and can be connected in set rotational increments is comprised of three elements: a plug attached to the male-side of the joint, and a receptacle and a tabbed ring attached to the female-side side of the joint. The male-side and female-side are connected by sliding the plug into the receptacle and rotating the tabbed ring a partial turn. Reversing the connecting steps separates the joint.

7 Claims, 4 Drawing Sheets

MULTI-FORCE RESISTANT MECHANICAL JOINT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Mechanical joints and hand-manipulated mechanical joints find uses across multiple industries and consumer applications.

Our first introduction to mechanical joints usually comes in children's toys. Christiansen's patent (3,005,282), the Lego® mechanical joint, for example, is a friction-based joint. To connect the joint, the user overcomes friction while sliding the pieces together. That same friction holds the pieces together. While tiny, the Lego® mechanical joint suffers from one primary drawback: low strength. In tension, the separation force is roughly equal to the connecting force. Increasing the joint strength makes connecting more difficult.

The cotter pin, similar to Smith's patent (362,548), on the other hand, forms a strong joint under any direction of imposed force. Under compression, tension, shear, and torsion, a cotter pin joint remains together. Additionally, if more holes are drilled for the pin, the joint can be rotated and re-connected in set rotational increments. Yet, the cotter pin suffers two disadvantages. Firstly, because of alignment and dexterity, connecting and separating can be difficult, particularly when the connecting structures are smaller than a finger. Secondly, because of an over-sized hole for the pin, wiggle remains after the joint has been formed, losing some dimensional accuracy.

The buckle, similar to Tracy's patent (4,150,464), finds uses in many consumer applications. It remains strong under any direction of imposed force, is easy to connect and separate, and is fairly dimensionally accurate. However, the buckle suffers some disadvantages. The joint strength is less than a cotter pin, because the male-side must be composed of materials flexible enough to snap-in. The buckle can only be connected in 180° rotational increments. Finally, the buckle is large for hand-manipulated joints, because fingers must be able to press the engaging flexible clasping arms.

BRIEF SUMMARY OF THE INVENTION

The present invention provides a mechanical joint that can be small yet hand-menipulated, is very strong, resists any direction of imposed force, is simple to connect and separate, tightly retains dimensional accuracy, and can be connected in set rotational increments.

Immediate applications target the rod-and-connector construction toy market. However, applications beyond that market seem likely.

DETAILED DESCRIPTION OF THE INVENTION

Figure 1:
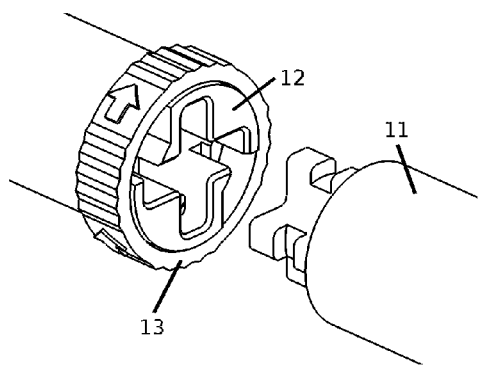
FIGS. 1-3 are a sequence of three frames, showing the joint connecting process in perspective view.
Figure 2:
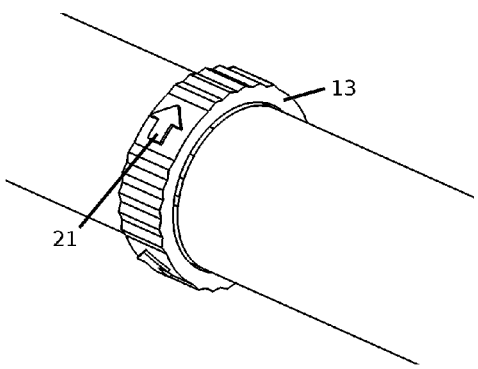
Figure 3:
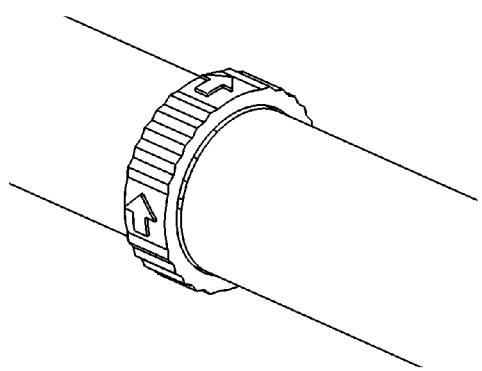

Referring now to the drawings, FIGS. 1-3 are a sequence of 3 frames, showing the joint connecting process for one embodiment. FIG. 1 begins with the joint apart. The male-side of the joint 11 is comprised of a single element. The female-side of the joint is comprised of two elements, a receptacle 12 and a tabbed ring 13. The tabbed ring is snapped onto the receptacle during factory assembly and cannot pop off.

To connect, the male-side slides into the female-side, FIG. 2. Then, the tabbed ring 13 rotates a partial turn in the direction of the tabbed ring's arrow 21 to complete the joint, FIG. 3. Once complete, the joint will not separate under compression, tension, shear, or torsional stresses between the male-side and female-side. Reversing FIGS. 1-3 easily separates the joint.

Figure 4:
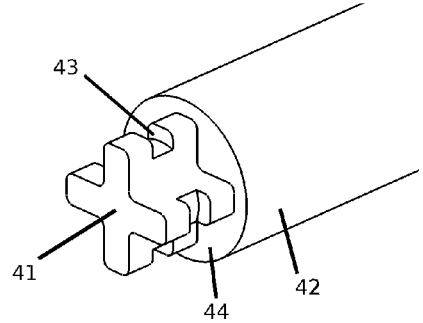
FIG. 4 shows a perspective view of a joint male-side.

FIG. 4 shows one embodiment of the male-side of the joint. The male-side is comprised of a single element. The element visually consists of two sections: a plug 41 and a male section 42. The plug has four fins extending radially from the axial axis forming a cross shape 41. Each fin is notched 43 almost halfway axially. The plug's face 44, shown hear as a planar face, must match the female-side receptacle face somewhat. The plug is 90° radially symmetric. That is, it can be rotated 90° around its axial axis, and it will be the same. The male section 42 behind the plug's face, shown here as a cylinder, can be any arbitrary shape, provided it does not impede the connecting process. Alternate embodiments with male-sides comprised of multiple elements, different numbers of plug fins, and different angles between plug fins are described later.

Figure 5:
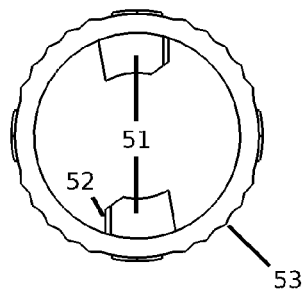
FIGS. 5-6 show front and perspective views of a tabbed ring.
Figure 6:
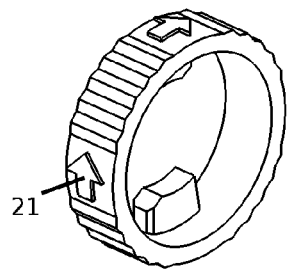

FIGS. 5 and 6 show front and perspective views of one embodiment of the female-side tabbed ring. The tabbed ring is 180° radially symmetric. It is comprised of a ring with two inner tabs 51. The tab heights are sized to fit into the male-side plug notches. The tab widths are sized larger than the plug fin widths. The tab depths are sized to slide snugly into the plug fin notches. The tabs have a chamferred or filleted leading edge 52 to aid in alignment as the tabbed ring rotates into the male-side plug notches. The tabbed ring outer ring is knurled 53 to provide grip as the tabbed ring rotates. An arrow 21 on the outer ring shows the twist direction for connecting. The angled edges, chamfers, fillets, knurls, and arrows are not essential for proper joint function. The tabbed ring outer radius must exceed the inner radius sufficiently to strengthen the tabbed ring for twisting. Alternate embodiments with different numbers of tabs and different tab spacings are described later.

Figure 7:
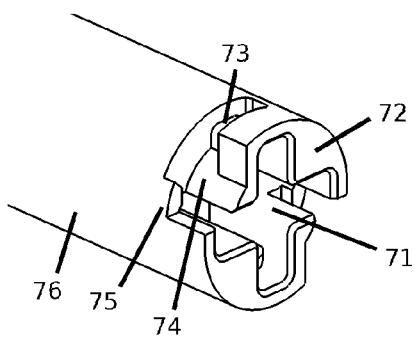
FIG. 7 shows a perspective view of a receptacle.

FIG. 7 shows details of one embodiment of the female-side receptacle. The receptacle is 180° radially symmetric. It ends in a plug-shaped axial hole 71, sized to receive the male-side's plug. A chamfer or fillet surrounds the axial hole, aiding male-side to female-side alignment. A partial cylinder 72 surrounds the axial hole. The face of the partial cylinder, shown here as a planar face, must match the male-side face sufficiently so that when the two faces abut, no rocking occurs. The partial cylinder radius is set slightly smaller than the tabbed ring inner radius, to allow the tabbed ring to rotate around the receptacle. A radial slot 73 breaks the partial cylinder. The tabbed ring tab rotates in the radial slot. A passageway 74 through the partial cylinder to the radial slot exists to allow the tabbed ring tab to slide axially into place during assembly. A step at the bottom of the slot 75 keeps the tabbed ring from sliding out after assembly. Because it only happens once and it is undesirable for the tabbed ring to fall off, the step size should be adjusted depending on the material, so that the tabbed ring stress reaches nearly its tensile strength as it snaps into place. The female section 76 behind the radial slot, shown here as a continuation of the partial cylinder, can be any arbitrary shape, provided it does not impede the connecting process. The chamfers and fillets are not essential for proper joint function. The passageway and step are not essential for proper joint function if alternate means, including, but not limited to, flexible materials or additive manufacturing, can be found to attach the ring to the receptacle. The partial cylinder may have various cylindrical deviations, including, but not limited to, a slightly elliptical cross section, grooves, detents, and alignment marks. Alternate embodiments with different axial holes are described later.

Figure 8:
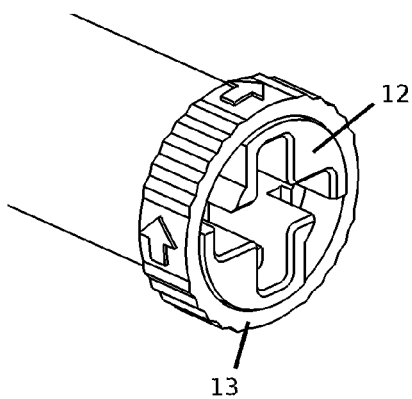
FIG. 8 shows a perspective view of a joint female-side.

FIG. 8 shows details of the joint female-side with the tabbed ring 13 snapped onto the receptacle 12. When assembled, the tabbed ring rotates one-eighth of a turn in this embodiment. After the male-side slides into the female-side, and the tabbed ring is fully rotated in the direction of the arrow, the tabbed ring tabs rest in the male-side plug notches, resisting compression and tension, much like a cotter pin.

Figure 9:
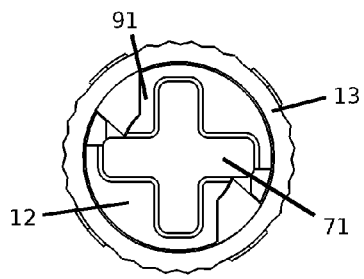
FIG. 9 shows a front view of the joint female-side where the tabbed ring is rotated for separation.
Figure 10:
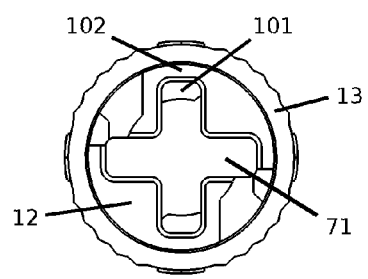
FIG. 10 shows a front view of the joint female-side where the tabbed ring is rotated for connection.

FIG. 9 shows the female-side of this embodiment, the receptacle 12 and the tabbed ring 13, front view when the tabbed ring is rotated for a separated joint. The male-side plug slides into and out-of the receptacle axial hole 71. Note that nothing impedes the plug in an axial direction (the direction of compression and tension). However, the plug shape impedes all forms of shear (side-to-side) and torsion (twist). A small amount of overlap 91 exists between the receptacle and the tabbed ring to keep the tabbed ring from falling out with no plug present. FIG. 10 shows the female-side front view when the tabbed ring is rotated for a connected joint. When a plug is present, the tabbed ring tabs rest in the plug notches, and the tabbed ring and plug overlap 101 at the notches. Additionally, the tabbed ring overlaps the receptacle 102. Compression or tension on the plug, push or pull the tabbed ring, which pushes or pulls the receptacle. The joint now resists all forms of stress: compression, tension, shear, and torsion.

The embodiment thus far described is optimized for plastic injection molding and hand-manipulated joints. However, other manufacturing processes, including, but not limited to, machining, casting, and additive manufacturing may also manufacture all elements of the joint. Materials, including, but not limited to, plastics, wood, or metal may be used for manufacturing. Finally, the joint is not limited to hand operation. Machinery, tools, or other means could be used to move the joint.

Figure 11:
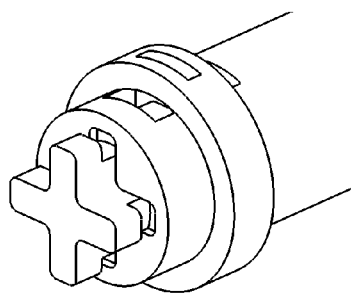
FIG. 11 shows a perspective view of an alternate embodiment of the joint male-side where the plug can slide inside the male section.
Figure 12:
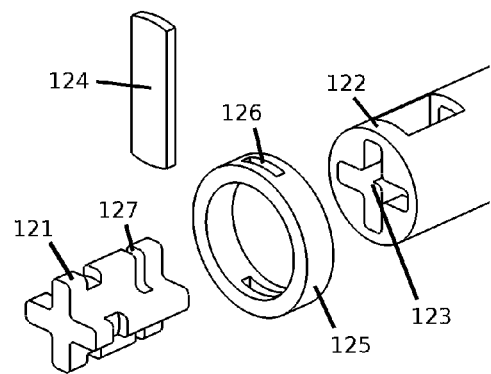
FIG. 12 shows a perspective view of the various elements comprising the joint male-side of FIG. 11.

The plug need not be rigidly connected to the male section. FIG. 11 shows an alternate embodiment of the male-side. The male-side is now an assembly of four elements. FIG. 12 shows the four elements of the male-side assembly. The plug 121, now separate from the male section 122, slides into the male section's front plug-shaped axial hole 123. The plug can slide completely into the male section, not protruding at all. A male tab 124 and a male ring 125 keep the plug inside the male section. To assemble, the male ring slides over the male section, the plug slides into the male section, then the male tab slides through the male ring hole 126 and plug hole 127 holding the plug, male ring, and male tab tightly together. The male ring makes sliding of the plug assembly easier. One skilled in the art could devise alternate embodiments to keep the separate plug inside the male section.

Figure 13:
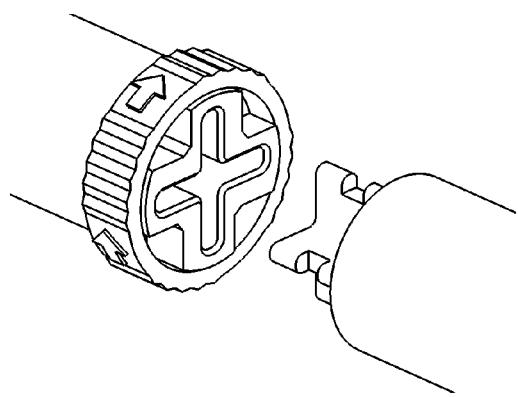
FIG. 13 shows a perspective view of an alternate embodiment of the joint male-side and female-side where all four plug fins engage the tabbed ring when connected.
Figure 14:
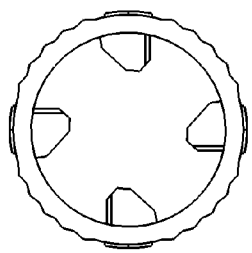
FIG. 14 shows a front view of FIG. 13's tabbed ring.

The embodiments described thus far have only two of the four plug fins engaging the tabbed ring when connected. From one to all of the plug fins could be engaged. FIG. 13 shows an alternate embodiment of the male section, tabbed ring, and receptacle. In this embodiment, the tabbed ring has four tabs, and all plug fins engage the tabbed ring when connected. FIG. 14 shows the tabbed ring front view. Depending on available materials and processes, this embodiment can increase joint strength.

Figure 15:
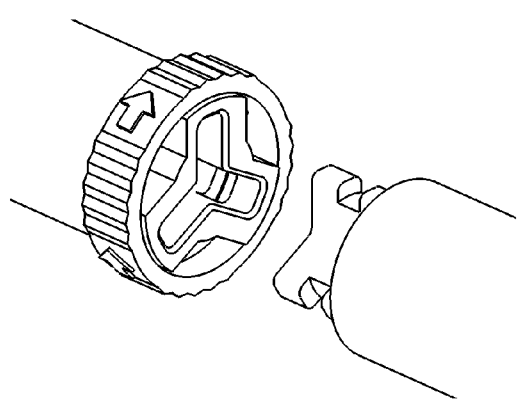
FIG. 15 shows a perspective view of an alternate embodiment of the joint male-side and female-side where the joint connects in 120° rotational increments.
Figure 16:
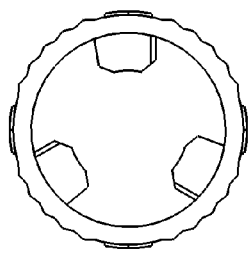
FIG. 16 shows a front view of FIG. 15's tabbed ring.

The joint may connect in rotational increments different than 90°. FIG. 15 shows an alternate embodiment of the male section, tabbed ring, and receptacle, configured for connecting in 120° rotational increments. In this embodiment, the tabbed ring has three tabs spaced 120° apart. FIG. 16 shows the tabbed ring front view. One skilled in the art can modify the fin count and spacing to achieve differing rotational increments or none at all.

The detailed description above exposes a number of advantages to this joint:

All components that hold the joint together (tabbed ring tabs, receptacle partial cylinder, and plug) need not be directly manipulated on connection and separation. They can be made very small relative to the manipulated pieces (female section, tabbed ring, and male section). Thus, the joint can be very small yet hand-manipulated.

No element needs to snap or flex more than once. Therefore, the joint can be made of very strong, rigid materials.

The joint resists all directions of imposed force: compression, tension, shear, and torsion.

The two motion connection step of slide and twist is very simple.

No amount of slop is necessary to help alignment. All sliding piece tolerances can be arbitrarily tightened. Alignment is guided by the chamfers and fillets. Thus, the joint retains tight dimensional accuracy.

Regular angular spacing of plug fins allows the male-side to connect the female-side at set rotational increments.

The invention claimed is:
1. A connecting device, comprising:
(a) a structure forming a male section,
(b) a plug having at an end a face and a plurality of fins protruding axially from said face and radially from each other, with said fins having notches at their radial extremity and partway from their axial extremity,
(c) said plug attached to said male section, forming a male-side,
(d) a ring with a plurality of tabs extending radially toward the center, forming a tabbed ring,
(e) a structure having at an end a partial cylinder with a plurality of radial slots and an axial hole sized to receive said plug axially and impede said plug radially,
(f) said tabbed ring attaching to said partial cylinder, and when attached, said tabbed ring rotates about said partial cylinder with said tabs radially sliding in said partial cylinder radial slots, forming a female-side,
(g) connecting means for connecting said male-side and said female-side by axially sliding said male-side fins into said female-side axial hole and twisting said female-side tabbed ring until said tabs slide into said notches,
(h) separating means for separating said male-side and said female-side by reversing said connecting means,
(i) whereby under said connecting means, said face abutting against said partial cylinder resists compression, said tabs passing through said radial slots and resting inside said notches resists tension, said fins resting inside said axial hole resists shear and torsion, so that said male-side and said female-side remain connected under compression, tension, shear, and torsion.

2. The connecting device of claim 1 wherein said plug is rigidly attached to said male section.

3. The connecting device of claim 1 wherein said plug is slidably attached to said male section.

4. The connecting device of claim 1 wherein said partial cylinder has axial passageways for said tabs to allow said tabbed ring to slide axially into place during assembly.

5. The connecting device of claim 1 wherein said partial cylinder has axial passageways for said tabs to allow said tabbed ring to slide axially and means for snapping said tabbed ring into place during assembly.

6. The connecting device of claim 1 wherein detents or intentional interference between said tabbed ring and said partial cylinder or between said tabbed ring and said fins form a snap feel on connecting.

7. The connecting device of claim 1 wherein said female-side or said male-side have various marks to visually aid said connecting means and said separating means.

\* \* \* \* \*